United States Patent [19]

Forrest et al.

[11] Patent Number: 5,553,296
[45] Date of Patent: Sep. 3, 1996

[54] TOUCH SCREEN POWER CONTROL IN A COMPUTER SYSTEM

[75] Inventors: Craig S. Forrest, San Francisco; Edward H. Frank, Portola Valley, both of Calif.

[73] Assignee: Sun Microsystems, Inc., Mountain View, Calif.

[21] Appl. No.: 390,935

[22] Filed: Feb. 17, 1995

Related U.S. Application Data

[63] Continuation of Ser. No. 68,903, May 28, 1993, abandoned.

[51] Int. Cl.⁶ .................................................. G06F 1/26
[52] U.S. Cl. ............................................. 395/750; 364/707
[58] Field of Search ............................. 395/750; 341/34; 364/492–3, 707, 493

[56] References Cited

U.S. PATENT DOCUMENTS

| | | | |
|---|---|---|---|
| 4,323,888 | 4/1982 | Cole | 340/365 |
| 4,593,323 | 6/1986 | Kanda et al. | 358/256 |
| 4,825,209 | 4/1989 | Sasaki et al. | 340/825 |
| 4,874,063 | 10/1989 | Taylor | 187/130 |
| 4,885,580 | 12/1989 | Noto et al. | 341/23 |
| 4,914,624 | 4/1990 | Dunthorn | 395/275 |
| 5,007,014 | 4/1991 | Nishimura | 371/16.3 |
| 5,142,662 | 8/1992 | Gump et al. | 395/100 |
| 5,167,024 | 11/1992 | Smith et al. | 395/750 |
| 5,241,308 | 8/1993 | Young | 341/34 |
| 5,249,298 | 9/1993 | Bolan et al. | 395/750 |
| 5,301,334 | 4/1994 | Horiuchi | 395/750 |
| 5,347,167 | 9/1994 | Singh | 364/493 |
| 5,355,503 | 10/1994 | Soffel et al. | 395/750 |
| 5,359,540 | 10/1994 | Ortiz | 364/492 |

FOREIGN PATENT DOCUMENTS

| 92101024 | 1/1992 | European Pat. Off. | G06F 3/033 |
|---|---|---|---|
| 63-0172070 | 7/1988 | Japan | G06F 3/033 |

*Primary Examiner*—Jack B. Harvey
*Assistant Examiner*—Paul R. Myers
*Attorney, Agent, or Firm*—Irell & Manella LLP

[57] ABSTRACT

A touch screen power control function in a computer system, wherein a touch screen input device is employed to control power modes for the computer system. A touch screen controller senses a touch input from the touch screen input device. If the computer system is in a full power mode, the touch screen controller determines the input coordinates corresponding to the touch input, and transfers the input coordinates to a central processing system. If the computer system is in a power down mode, the touch screen controller asserts a main power on signal to a power subsystem, which causes the power subsystem to supply power to the central processing system according to the touch input.

16 Claims, 2 Drawing Sheets

TOUCH SCREEN POWER CONTROL IN A COMPUTER SYSTEM

This is a continuation of application (S) Ser. No. 08/068,903, filed May 28, 1993, now abandoned

BACKGROUND OF THE INVENTION

1. Field of the Invention

This invention relates to the field of power control functions in computer systems. More particularly, this invention relates to a touch screen power control function in a computer system.

2. Art Background

Past computer systems typically implement a hard power control system for supplying power to the various portions of the computer system. A hard power control system includes a physical switch that directly controls the input power to the computer system. The input power may consist of main incoming alternating current (AC) or direct current (DC).

Soft power control is commonly implemented in personal computer systems and portable computer systems to conserve power and increase battery life. Soft power control in a computer system usually encompasses several power control modes, including a full power mode and a sleep mode. In the full power mode, the main portions of the computer system are supplied with power and are all in an active state. In the sleep mode, one or more portions of the computer system are not supplied with power and are in an inactive state.

The power supply for a soft power control system typically provides more than one power output. One power output is always switched on to provide power for the logic that controls the soft power function. Another power output provides power to the main portions of the computer system. When the computer system is in the sleep mode, a user depresses a key on the keyboard to cause the soft power control logic to switch on power to the main portions of the computer system.

As will be described, the present invention is a method and apparatus for a soft power control function in a computer system that provides power control from a touch screen. The present invention minimizes system power consumption while eliminating the need for a separate power switch.

SUMMARY OF THE INVENTION

A touch screen power control function in a computer system is disclosed, wherein a touch screen input device is employed to control power modes for the computer system. A touch screen controller senses a touch input from the touch screen input device. The touch screen controller processes the touch input according to a power mode for the computer system.

If the computer system is in a full power mode, the touch screen controller determines the input coordinates corresponding to the touch input, and transfers the input coordinates to a central processing system.

If the computer system is in a power down mode, the touch screen controller asserts a main power on signal to a power subsystem of the computer system after the touch input is sensed. The main power on signal causes the power subsystem to supply power to the central processing system. The power subsystem also asserts a reset signal to the central processing system.

The reset signal to the central processing system causes the computer system to enter the full power mode. A user command input causes the computer system to enter the power down mode. Alternatively, the system software causes the computer system to enter the power down mode through a time-out mechanism.

While in the power down mode, the touch screen controller senses a touch input from the touch screen input device by sensing a duration of the touch input from the touch screen input device. The touch screen controller asserts the main power on signal to a power subsystem of the computer system if the duration of the touch input from the touch screen is greater than a predetermined duration.

Alternatively, the touch screen controller maintains a tap count by sensing and counting at least one tap input from the touch screen input device while in the power down mode. The touch screen controller asserts the main power on signal to the power subsystem of the computer system if the tap count exceeds a predetermined tap count.

DETAILED DESCRIPTION OF THE INVENTION

A touch screen power control function in a computer system is disclosed. In the following description for purposes of explanation specific applications, numbers, apparatus, configurations and circuits are set forth in order to provide a thorough understanding of the present invention. However, it will be apparent to one skilled in the art that the present invention may be practiced without these specific details. In other instances well known systems are shown in diagrammatical or block diagram form in order not to obscure the present invention unnecessarily.

Figure 1:
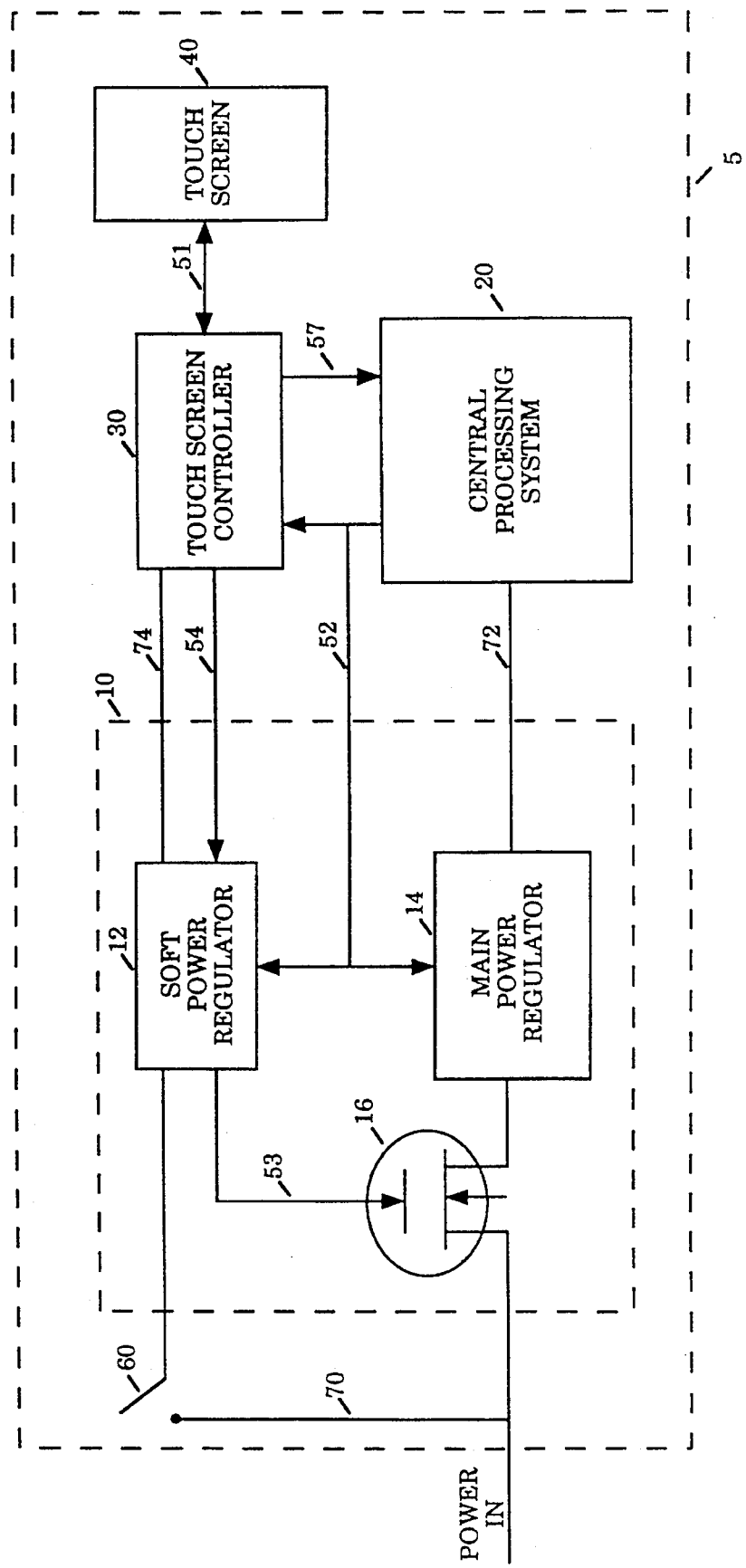
FIG. 1 is a functional block diagram of a computer system including a central processing system, a power subsystem, as well as a touch screen and a touch screen controller.

Referring now to FIG. 1, a functional block diagram of a computer system 100 is shown. The computer system 5 comprises a central processing system 20. The central processing system 20 includes a central processing unit (CPU), memory subsystems, mass storage subsystems, a display device, and an assortment of other input/output devices. For one embodiment, the display device comprises a liquid crystal digital (LCD) display device. Alternatively, the display device comprises a cathode ray tube (CRT).

The computer system 5 also comprises a power subsystem 10, a touch screen 40, and a touch screen controller 30. The touch screen 40 is positioned in relation to the display device of the central processing system 20 such that images generated on the display device are visible through the touch screen 40. The touch screen 40 and the touch screen controller 30 are powered independently from the central processing system 20.

The power subsystem 10 comprises a soft power regulator 12, a main power regulator 14, and a power switch 16. The power switch 16 may be a power field effect transistor (FET) or a power relay.

The soft power regulator 12 receives a power input 70 through a power-on switch 60. The main power regulator 14 is supplied with the power input 70 through the power switch 16. The soft power regulator 12 generates a power control signal 53 to switch the power switch 16 on and off. The main power regulator 14 supplies the central processing system 20 with a regulated power 72. The soft power regulator 12 supplies the touch screen controller 30 and the touch screen 40 with a regulated power 74.

The touch screen 40 and the touch screen controller 30 provide a means for entering X and Y positioning information into the central processing system 20. The X and Y positioning information corresponds to coordinates on the display surface of the display device of the central processing system 20. The touch screen 40 and the touch screen controller 30 also provide Z information into the central processing system 20. The Z information provides an indication of pressure applied to the touch screen 40.

The positioning of the touch screen 40 in relation to the display device provides a direct physical link between X and Y positions sensed by the touch screen 40 and X and Y positions on the display surface of the display device.

A user generates X and Y and Z inputs to the central processing system 20 by pointing to a portion of the display surface of the display device and physically touching the surface of the touch screen 40. The touch screen 40 generates touch screen control signals 51 in response to the user's physical contact with the surface of the touch screen 40.

The touch screen controller 30 implements a CPU and associated software for performing the process steps described herein. The touch screen controller 30 senses touch screen control signals 51, and determines the X and Y and Z positioning information corresponding to the user's physical contact. The touch screen controller 30 transfers the X and Y and Z positioning information to the central processing system 20 over signal lines 57.

For one embodiment, the touch screen 40 comprises a resistive touch screen. The resistive touch screen 40 comprises two sheets of clear conductive material forming a pair of clear conductive layers in front of the display device. When the user presses on the top layer, the electrical resistance between the two layers is altered. The user presses on the top layer of the touch screen 40 with either a pen or a finger.

For an alternative embodiment, the touch screen 40 comprises a capacitive touch screen. The capacitive touch screen 40 comprises a sheet of clear conductive material positioned in front of the display device. When the user presses on the clear conductive material, the electrical capacitance of the conductive material is altered. The user presses on the capacitive layer of the touch screen 40 with either a pen or a finger.

For another embodiment, the touch screen 40 comprises an inductive touch screen. The inductive touch screen 40 is positioned in front of the display surface of the display device. Alternatively, the inductive touch screen 40 is positioned behind the display surface of the display device. The user positions a pen near the surface of the touch screen 40 to induce electrical signals in the touch screen 40.

The computer system 5 is in a hard power off mode when the input power 70 is removed from the power subsystem 10. The hard power off mode includes removal of both battery power and an AC or DC supply.

The computer system 5 transitions from the hard power off mode to full power on mode when the input power 70 is reapplied to the power subsystem 10. The input power 70 is reapplied to the power subsystem 10 by pressing the power-on switch 60. Pressing the power-on switch 60 causes the power subsystem 10 to apply power to both the touch screen controller 30 and the central processing system 20.

While the computer system 5 is in the full power on mode, the power subsystem 10 supplies power to the touch screen 40, the touch screen controller 30, and the central processing system 20 including the memory subsystems, the mass storage subsystems, and the display device. Pressure applied to the touch screen 40 with a pen or finger causes the touch screen controller 30 to interrupt the CPU of the central processing system 20. The touch screen controller 30 provides to the CPU the X and Y and Z coordinates sensed by the touch screen 40 and corresponding to the contact point between the pen or finger and the display surface of the display device.

The touch screen controller 30 provides the X and Y and Z coordinates to the CPU while the finger or pen is contacting the display surface of the display device. Thereafter, the touch screen controller 30 interrupts the CPU when the finger or pen is lifted, thereby enabling the CPU to process the X and Y and Z inputs.

While the computer system 5 is in the full power on mode, the CPU initiates several power down sequences in response to either a low battery power condition, a user command, or a system software time-out. The CPU causes the computer system 5 to switch from the full power on mode to a full power off mode or to a power down mode.

For one embodiment, the user selects an item in a power control menu of a graphical user interface to cause the computer system 5 to transition from the full power on mode to the full power off mode or the power down mode.

For an alternative embodiment, the user runs a special program on the central processing system 20 to transition from the full power on mode to the full power off mode or the power down mode.

For another alternative embodiment, a set of X, Y and Z touch screen coordinates corresponding to a "hot corner" of the display device indicate to the CPU the percentage of the central processing system 20 to be supplied with power in the power down mode.

The CPU of the central processing system 20 causes the computer system 5 to transition from the full power on mode to the full power off mode by asserting a full power off signal over power control signal lines 52 to the power subsystem 10. The full power off signal causes the power subsystem 10 to turn off the regulated power 72 to the central processing system 20 and the regulated power 74 to the touch screen controller 30 and the touch screen 40.

The CPU of the central processing system 20 causes the computer system 5 to transition from the full power on mode to the power down mode by asserting a soft power signal over the power control signal lines 52 to the touch screen controller 30. The soft power signal causes the touch screen controller 30 to enter the power down mode.

The CPU of the central processing system 20 then asserts a main power off signal over power control signal lines 52 to the power subsystem 10. Alternatively, the touch screen controller 30 asserts the main power off signal over power control signal lines 52 to the power subsystem 10. The main power off signal causes the power subsystem 10 to turn off the regulated power 72 to the central processing system 20.

While the computer system 5 is in the power down mode, the touch screen controller 30 and the touch screen 40 are powered, and the central processing system 20 is unpowered. Pressure applied to the touch screen 40 with a pen or finger causes the touch screen controller 30 to assert a main power on signal over signal line 54 to the soft power regulator 12. The main power on signal 54 causes the soft power regulator 12 to switch on the power switch 16, and causes the main power regulator 14 to supply the regulated power 72 to the central processing system 20. The restoration of the regulated power 72 causes the central processing system to reactivate.

For one embodiment, the touch screen controller asserts the main power on signal 54 for an unspecified time period. After the touch screen 40 is pressed, the touch screen controller 30 asserts the main power on signal 54, and the power on signal remains asserted.

The time period between assertion of the power on signal 54 and a stable supply of the regulated power 72 to the computer system 20 will vary because the power subsystem 10 incurs some latency before providing the stable regulated power 72. However, once the regulated power 72 is fully supplied to the central processing system 20, the power subsystem 10 generates a system reset signal. The system reset signal causes the CPU to reset, and causes the touch screen controller 30 to reset.

The reset of the touch screen controller 30 causes the touch screen controller 30 to transition from the power down mode to the full power on mode. As a consequence, the transition of the computer system 5 from the power down mode to the full power on mode is completely self timed.

The difference between the full power on mode, the power down mode, and the full power off mode is the percentage of the computer system 5 that is receiving power in an active state. For alternative embodiments, a plurality of power modes exist between the full power on mode, the power down mode, and the full power off mode.

Figure 2:
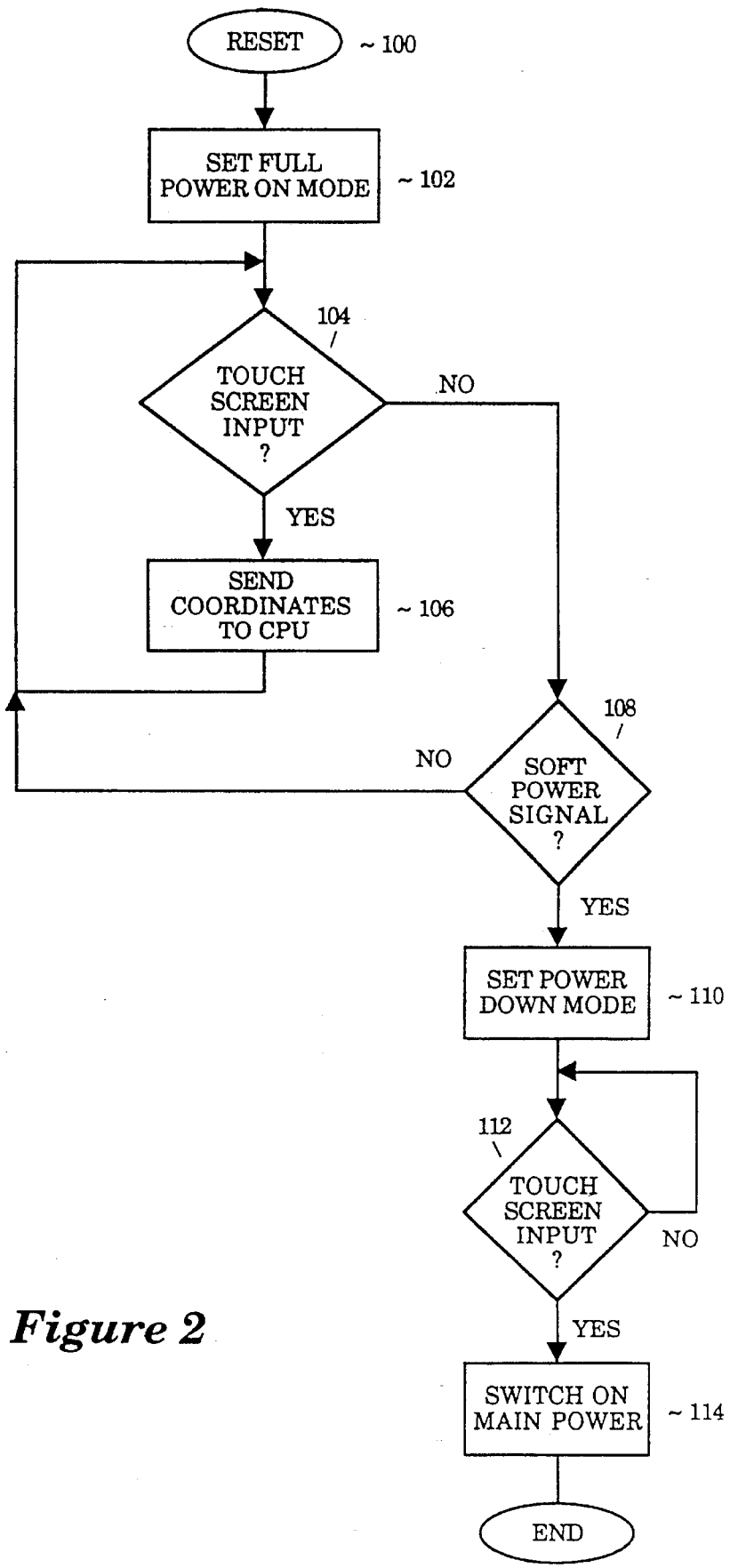
FIG. 2 is a flow diagram illustrating the functions of the touch screen controller during the full power on mode and the power down mode.

FIG. 2 is a flow diagram illustrating the functions of the touch screen controller 30 during the full power on mode and the power down mode. After the power subsystem 10 switches on the regulated power 72 to the central processing system 20, the power subsystem 10 generates a reset signal for the central processing system 20. The reset signal causes the touch screen controller 30 to enter a reset state 100.

The touch screen controller 30 transitions from the reset state 100 to a state 102. At the state 102, the touch screen controller 30 sets an internal full power on mode flag. Thereafter, the touch screen controller 30 proceeds through a loop comprising a decision state 104 and a state 106 to process touch inputs from the touch screen 40.

At the decision block 104, the touch screen controller 30 checks for touch inputs from the touch screen 40. If the touch screen controller 30 senses an input from the touch screen at decision state 104, the touch screen controller 30 proceeds to the state 106.

At the state 106, the touch screen controller 30 processes the touch input from the touch screen 40, interrupts the CPU, and transfers the corresponding touch screen X, Y and Z coordinates to the CPU. Thereafter, the touch screen controller 30 loops back to the decision state 104 to check for another touch input from the touch screen 40.

If the touch screen controller 30 does not sense a touch input from the touch screen 40 at decision state 104, the touch screen controller 30 proceeds to a decision state 108. At the decision state 108, the touch screen controller 30 checks for the soft power signal from the central processing system 20 over the power control signal lines 52. If the touch screen controller 30 does not sense the soft power signal at the decision state 108, the touch screen controller 30 loops back to the decision state 104 to check for further touch inputs from the touch screen 40.

If the touch screen controller 30 does sense the soft power signal at the decision state 108, the touch screen controller 30 proceeds to a state 110. At the state 110, the touch screen controller 30 sets an internal power down mode flag and deasserts the power on signal 54. The deasserted power on signal 54 causes the main power regulator 14 to switch off the power switch 16, thereby turning off the main power regulator 14. Thereafter, the touch screen controller 30 proceeds to a decision state 112.

At the decision state 112, the touch screen controller 30 checks for touch inputs from the touch screen 40. The touch screen controller 30 remains in the decision state 112 until sensing a touch input from the touch screen 40. If the touch screen controller 30 senses a touch input from the touch screen at decision state 112, the touch screen controller 30 proceeds to a state 114.

At the state 114, the touch screen controller 30 asserts the main power on signal 54 to the power subsystem 10. The touch screen controller 30 asserts the main power on signal 54 indefinitely. The main power on signal 54 causes the soft power regulator 12 to switch on the power switch 16, and causes the main power regulator 14 to supply the regulated power 72 to the central processing system 20. The power subsystem 10 also asserts a reset signal that causes the touch screen controller 30 to transition to the reset state 100.

For one embodiment, the touch screen 40 must be pressed for a predetermined duration before the touch screen controller 30 asserts the main power on signal 54 to the power subsystem 10. Pressing the touch screen 40 for the predetermined duration prevents an accidental transition from the power down mode to the full power mode caused by random contact with the touch screen.

For another embodiment, the touch screen controller 30 must sense multiple press/lift inputs from the touch screen 40 before asserting the main power on signal 54. For example, the touch screen controller 30 may require a quick double tap on the touch screen 40 before asserting the main power on signal.

For another embodiment, the power subsystem 10 provides multiple regulated power outputs for sub elements of the central processing system 20. The touch screen controller 30 determines the length of time that the touch screen 40 is pressed while in the power down mode. Based upon the length of time that the touch screen 40 is pressed, the touch screen controller 30 asserts power control signals to the power subsystem 10 to switch on a subset of the regulated outputs. The regulated outputs that are switched on varies according to the length of time that the touch screen 40 is pressed.

For example, a short duration press on the touch screen 40 switches on only the CPU. A longer duration press on the touch screen 40 switches on the CPU and the display. An even longer duration press on the touch screen 40 switches on the CPU and the display, and the mass storage subsystems.

For another embodiment having multiple regulated power outputs, the touch screen controller 30 determines the magnitude of pressure on the touch screen 40 while in the power down mode. Based upon the magnitude of the pressure on the touch screen 40, the touch screen controller 30 asserts the power control signals to the power subsystem 10 to switch on a subset of the regulated outputs. For example, a low magnitude press on the touch screen 40 switches on only the CPU. A higher magnitude press on the touch screen 40 switches on the CPU and the display. An even higher magnitude press on the touch screen 40 switches on the CPU and the display, and the mass storage subsystems.

For another embodiment having multiple regulated power outputs, the touch screen controller 30 counts a number of taps on the touch screen 40 while in the power down mode. Based upon the number of taps on the touch screen 40, the touch screen controller 30 asserts power control signals to the power subsystem 10 to switch on a subset of the regulated outputs. For example, one tap on the touch screen 40 switches on only the CPU, two taps on the touch screen 40 switches on the CPU and the display, while three taps on the touch screen 40 switches on the CPU and the display, and the mass storage subsystems.

For another embodiment having multiple regulated power outputs, the touch screen controller 30 determines the X and Y and Z coordinates of pressure on the touch screen 40 while in the power down mode. Based upon the X and Y and Z coordinates, the touch screen controller 30 asserts power control signals to the power subsystem 10 to switch on a subset of the regulated outputs. The selective switching on of the regulated outputs is determined by the X and Y and Z coordinates.

In the foregoing specification the invention has been described with reference to specific exemplary embodiments thereof it will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A method for selectively and interactively controlling the supply of power to a battery-powered computer system by means of a finite-state machine, said computer system comprising a central processing unit (CPU) coupled to a touch screen controller which controls a touch sensitive display screen, said method comprising the steps of:

a. responsive to a reset signal, transitioning said touch screen controller to a reset state;

b. operative when said touch screen controller is in said reset state, transitioning said touch screen controller to a second state;

c. operative when said touch screen controller is in said second state, setting an internal full power on mode flag and transitioning said touch screen controller to a first decision state;

d. operative when said touch screen controller is in said first decision state, checking for a first touch input from said touch sensitive display screen; operative when said first touch input is present, transitioning said touch screen controller to a transfer state; and operative when said first touch input is not present, transitioning said touch screen controller to a second decision state;

e. operative when said touch screen controller is in said transfer state, interrupting said CPU, transferring the X, Y, and Z coordinates of said first touch input to said CPU, and transitioning said touch screen controller back to said first decision state;

f. operative when said touch screen controller is in said second decision state, checking for the assertion of a soft power signal; operative when said soft power signal is not asserted, transitioning said touch screen controller back to said first decision state; and operative when said soft power signal is asserted, transitioning said touch screen controller to a shutdown state;

g. operative when said touch screen controller is in said shutdown state, setting an internal power down mode flag, deasserting a power on signal, transitioning said touch screen controller to a third decision state;

h. operative when said touch screen controller is in said third decision state, checking for a second touch input and, operative when said second touch input is present, transitioning to a power-up state;

i. operative when said touch screen controller is in said power-up state, asserting said power on signal.

2. The method of claim 1, said method further comprising the step supplying power only to a portion of said computer, said portion comprising said touch. screen controller, said power-supplying step being operative when said power on signal is deasserted.

3. The method of claim 1, where said soft power signal is asserted by said CPU responsive to user input.

4. The method of claim 1, where the step of checking for a second touch input in step h checks for a quick double tap on said touch sensitive display screen.

5. The method of claim 2, where said portion of said computer is a function of some characteristic said second touch input.

6. The method of claim 5, where said portion of said computer is a function of the pressure of said second touch input.

7. The method of claim 6, where said portion of said computer is a function of the duration of said second touch input.

8. The method of claim 6, where said portion of said computer is a function of the number of taps in said second touch input.

9. An apparatus for selectively and interactively controlling the supply of power to a battery-powered computer system by means of a finite-state machine, said computer system comprising a central processing unit (CPU) coupled to a touch screen controller which controls a touch sensitive display screen, said apparatus comprising:

a. means responsive to a reset signal for transitioning said touch screen controller to a reset state;

b. means operative when said touch screen controller is in said reset state for transitioning said touch screen controller to a second state;

c. means operative when said touch screen controller is in said second state for setting an internal full power on mode flag and transitioning said touch screen controller to a first decision state;

d. means operative when said touch screen controller is in said first decision state for checking for a first touch input from said touch sensitive display screen, transitioning said touch screen controller to a transfer state when said first touch input is present, and transitioning said touch screen controller to a second decision state when said first touch input is not present;

e. means operative when said touch screen controller is in said transfer state for interrupting said CPU, transferring the X, Y, and Z coordinates of said first touch input to said CPU, and transitioning said touch screen controller back to said first decision state;

f. means operative when said touch screen controller is in said second decision state for checking for the assertion of a soft power signal, transitioning said touch screen controller back to said first decision state when said soft power signal is not asserted, and transitioning said touch screen controller to a shutdown state when said soft power signal is asserted;

g. means operative when said touch screen controller is in said shutdown state for setting an internal power down mode flag, deasserting a power on signal, and transitioning said touch screen controller to a third decision state;

h. means operative when said touch screen controller is in said third decision state for checking for a second touch input and transitioning to a power-up state when said second touch input is present;

i. means operative when said touch screen controller is in said power-up state for asserting said power on signal.

10. The apparatus of claim 9, further comprising means for supplying power only to a portion of said computer, said portion comprising said touch screen controller, said power-supplying step being operative when said power on signal is deasserted.

11. The apparatus of claim 9, where said soft power signal is asserted by said CPU responsive to user input.

12. The apparatus of claim 9, where said means for checking for a second touch input checks for a quick double tap on said touch sensitive display screen.

13. The apparatus of claim 10, where said portion of said computer is a function of some characteristic said second touch input.

14. The apparatus of claim 13, where said portion of said computer is a function of the pressure of said second touch input.

15. The apparatus of claim 13, where said portion of said computer is a function of the duration of said second touch input.

16. The apparatus of claim 13, where said portion of said computer is a function of the number of taps in said second touch input.

\* \* \* \* \*